June 26, 1962 C. VAN DER LELY 3,040,510
THREE WHEELED TRACTOR
Filed Nov. 19, 1958 5 Sheets-Sheet 3
Fig. 3
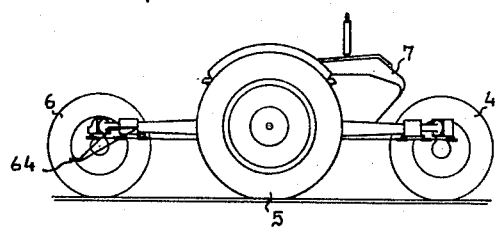
Fig. 9
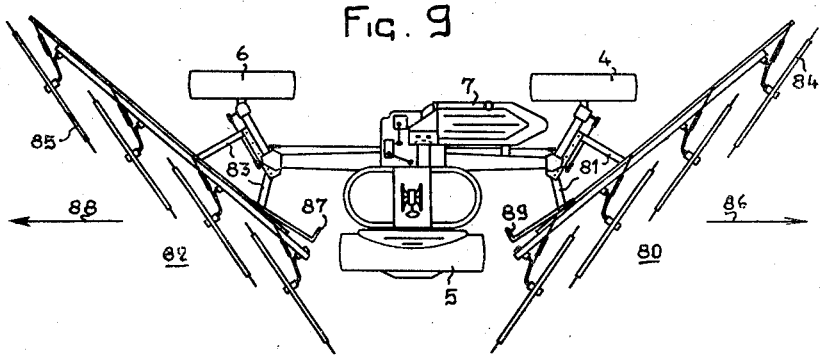
Fig. 10

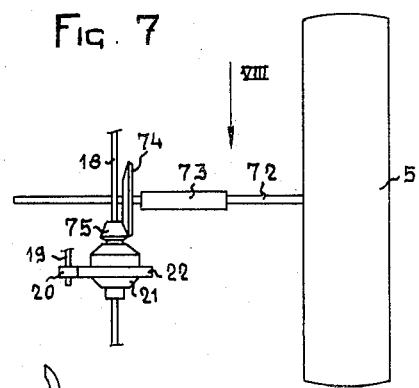
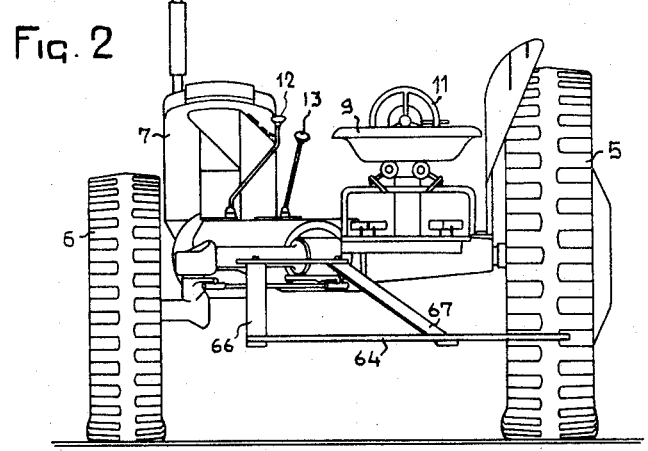
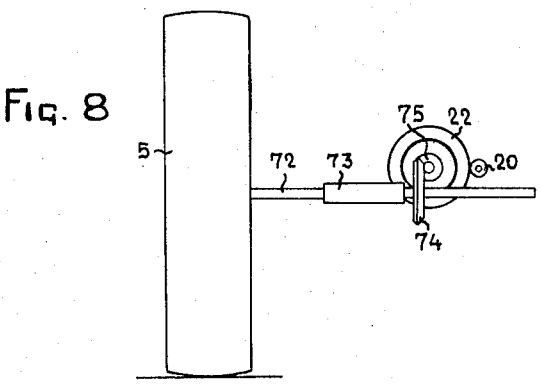

June 26, 1962  C. VAN DER LELY  3,040,510
THREE WHEELED TRACTOR
Filed Nov. 19, 1958  5 Sheets-Sheet 4
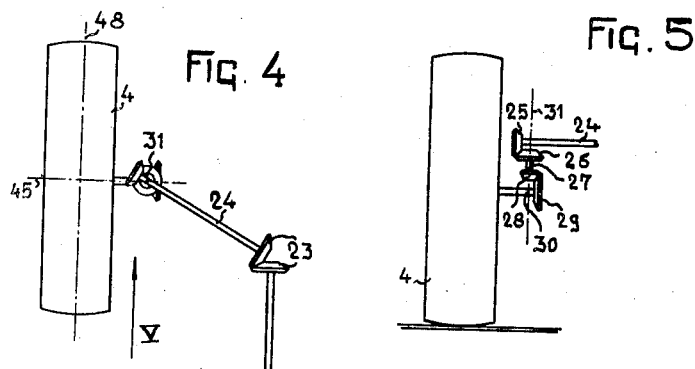
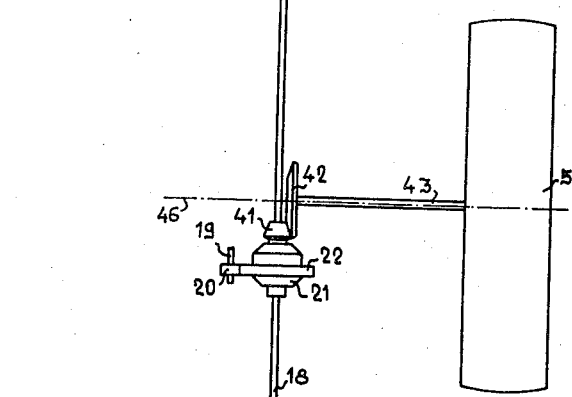
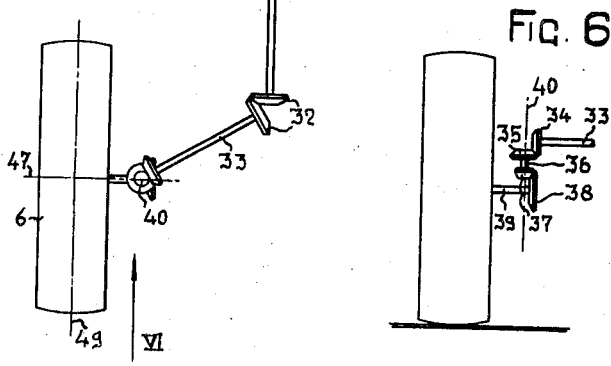

June 26, 1962   C. VAN DER LELY   3,040,510
THREE WHEELED TRACTOR

Filed Nov. 19, 1958   5 Sheets-Sheet 5

United States Patent Office 3,040,510
Patented June 26, 1962

3,040,510
THREE WHEELED TRACTOR
Cornelis van der Lely, Maasland, South-Holland, Netherlands, assignor to Patent Concern N.V., Willemstad, Netherlands, a limited company at Curacao
Filed Nov. 19, 1958, Ser. No. 774,868
Claims priority, application Netherlands Nov. 25, 1957
10 Claims. (Cl. 56—377)

This invention relates to tractors of the type comprising a frame with at least three running wheels which are, viewed in the longitudinal direction of the tractor, situated behind one another, the outermost—with respect to the longitudinal direction—running wheels being situated at one side of the longitudinal axis of the tractor, whereas a third running wheel is situated at the other side of this longitudinal axis.

One object of the invention is to provide a tractor of the above mentioned kind, in which the driver has a very good view both in the forward and in the backward movement of the device. According to the invention the motor of the tractor is situated at one side of this longitudinal axis and the driver's seat at the other side.

Another object of the invention is to provide an implement tractor combination having a very favourable position of the implement with respect to the tractor. According to this feature of the invention the tractor is provided on at least one side with means for attaching an implement to the tractor which extends substantially parallel to the line connecting the third running wheel to the outermost running wheel at that side of the tractor to which the implement is attached.

According to still another object of the invention the device is provided with more than three running wheels thus insuring a readily controlled tractor which is very stable. So as to obtain this feature, two running wheels are arranged at both sides of the longitudinal axis of the tractor, there being two outermost running wheels which are situated at the same side and are steerable wheels, there being the two middlemost wheels at the other side which are unsteerable wheels.

An advantageous combination of a tractor according to the invention with an implement is obtained by supporting the tractor at one end by two wheels, which are located one behind the other in the direction of travel, the implement coupled with the tractor at the same end being located obliquely with respect to the direction of travel. As will be shown, an implement so coupled with the tractor can be readily supported by the tractor wheels and need not have running wheels.

The invention will next be described more fully with reference to the drawings in which:

FIG. 2 is an end view of the tractor shown in FIG. 1, in the direction of arrow II of FIG. 1.

FIG. 3 shows, on a smaller scale, a side view taken in the direction of arrow III of the tractor shown in FIG. 1.

FIG. 4 is a diagrammatic view of the drive provided for the wheels of the tractor shown in FIG. 1.

FIG. 5 illustrates a detail of the drive seen in the direction of arrow V of FIG. 4.

FIG. 6 illustrates a further detail of the wheel drive seen in the direction of arrow VI of FIG. 4.

FIG. 7 shows a detail of the tractor shown in FIG. 1, where one running wheel is fastened to the frame in a different way.

FIG. 8 is a view of the detail shown in FIG. 7, viewed in the direction of the arrow VIII.

FIG. 9 shows, on a smaller scale, the tractor of FIG. 1, provided at both ends with a raking device.

FIG. 10 shows, on a smaller scale, a tractor of FIG. 1, provided at one end with a lifting device to which a shovel is secured.

Figure 1:
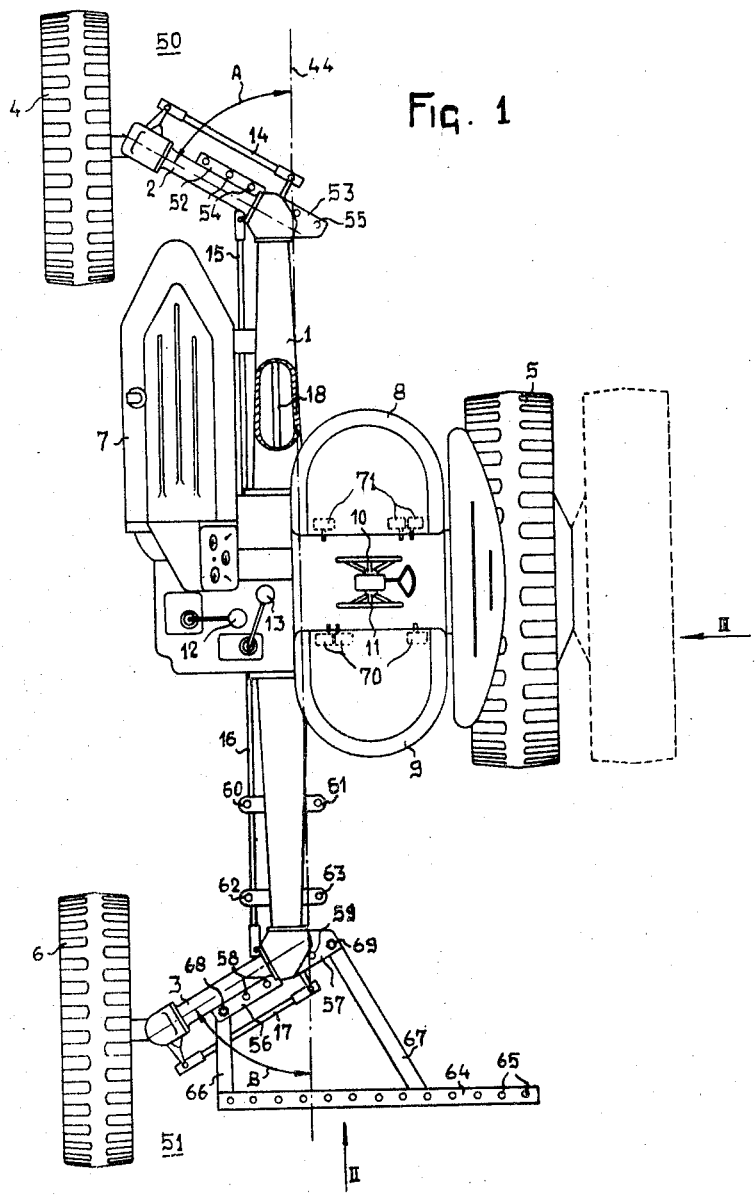
FIG. 1 is a plan view of a tractor according to the invention.

As shown in FIGS. 1 to 6, the frame of the device comprises a main frame beam 1, to the ends of which are secured two frame beams 2 and 3, which are at angles A and B respectively to the frame beam 1, these angles being smaller than 90°. The frame is supported by running wheels 4, 5 and 6, of which the wheels 4 and 6 have smaller diameters than the running wheel 5. The frame is furthermore provided with a motor 7 and an operator's platform having two seats 8 and 9; the motor 7 and the seats 8 and 9 being located each on one side of the frame beam 1. The running wheels 4 and 6 are steerable from the seats 8 and 9 by means of steering wheels 10 and 11; the steerable running wheel 4 is linked by means of steering rods 14 and 15 and the steerable running wheel 6 is linked by means of steering rods 16 and 17 to the steering device. From the seats 8 and 9 acceleration levers 12 and 13 can be actuated to control the speed of the tractor.

The wheels 4, 5 and 6 are driven by the motor 7. For driving these wheels, as shown in detail in FIGS. 4, 5 and 6, a shaft 18 is journalled in the hollow beam 1, this shaft being driven by the shaft 19, which is coupled with the motor 7. To this end, the shaft 19 is provided with a gear wheel 20 and on the shaft 18 is secured a differential gear 21 with a gear wheel 22, this wheel co-operating with the gear wheel 20. The shaft 18 drives a shaft 24 by means of a transmission 23, this shaft being provided at one end with a conical gear wheel 25, which drives a conical gear wheel 26, secured to a vertical shaft 27. The shaft 27 has, moreover, a conical gear wheel 28, which engages a conical gear wheel 29, seated on the horizontal axle 30 of the wheel 4. The center line 31 of the shaft 27 constitutes the vertical axis of rotation of the steerable wheel 4. The running wheel 6 is driven from the shaft 18 by means of a transmission 32, which drives a horizontal shaft 33, provided at one end with a conical gear wheel 34, coupled with a conical gear wheel 35. The gear wheel 35 is seated on a vertical shaft 36, provided with a conical gear wheel 37 co-operating with a conical gear wheel 38. The gear wheel 38 is seated on the horizontal axle 39 of the running wheel 6. The center line 40 of the vertical shaft 36 constitutes the vertical axis of rotation of the steerable wheel 6. The running wheel 5 is driven by the motor by means of a conical gear wheel 41, connected with the differential 21 and rotatable about the shaft 18 and co-operating with a conical gear wheel 42, seated on a horizontal shaft 43, which constitutes the horizontal axle of the running wheel 5.

The running wheels 4, 5 and 6, of which the wheels 4 and 6 are located on one side of the longitudinal axis 44 of the tractor and the wheel 5 is located on the other side of this axis, are arranged so that, viewed in the direction of this horizontal axis, the running wheels are placed behind one another, the running wheels 4 and 6 being the outermost running wheels. The horizontal axes of rotation 45 and 47 of the running wheels 4 and 6 are located at equal distances from the horizontal axis of rotation 46 of the running wheel 5, so that the running wheels 4 and 6 are located symmetrically with respect to the horizontal axis of rotation 46 (FIG. 4). With respect to the longitudinal axis 44 located centrally between the running wheel 5 and the running wheels 4 and 6, viewed in a direction at right angles to the said axis in the position in which the wheel 5 adjustable in the direction of its axis of rotation is at the smallest distance from the running wheels 4 and 6, the running wheels 4, 5 and 6 occupy an asymmetrical position. Since the running wheels 4 and 6 with respect to the horizontal axis of rotation 46 have symmetrical positions and since the running wheels 4 and 6 are driven by the vertical shafts 26 and 36 by means of a given transmission ratio, no differential gear need be provided between the running wheels 4 and 6. The given transmission ratio between the vertical shaft 27 and the running wheel 4 and that between the vertical shaft 36 and the running wheel 6 is such that, for example with the running wheel 4, the ratio between the diameter of this wheel and twice the distance between the central plane 48 of the running wheel 4 and the vertical axis of rotation 31 is equal to the ratio between the conical gear wheel 29 and the conical gear wheel 28, of which the conical gear wheel 29 constitutes a driven mechanism connected with the running wheel 4, whereas the conical gear wheel 28 constitutes a mechanism which drives the aforesaid mechanism. In the same manner, the ratio between the diameter of the running wheel 6 and twice the distance between the central plane 49 and the vertical axis of rotation 40 is equal to the ratio between the conical gear wheel 38 and the conical gear wheel 37. If the wheels 4 and 6 are steerable wheels, the running wheel 4 turning in a direction about the vertical axis of rotation 31 opposite the direction of rotation of the running wheel 6 about the vertical axis of rotation 40, the said given transmission ratio provides that the increase in speed of the running wheel 4, owing to the engagement of the conical gear wheel 29 with the conical gear wheel 28 is equal to the increase in speed of the running wheel 4 by turning this wheel about the axis of rotation 31, whereas the decrease in speed of the running wheel 6 owing to the engagement of the conical gear wheel 38 with the conical gear wheel 37 will be equal to the decrease in speed of the running wheel 6 by turning this running wheel about the vertical axis of rotation 40, or else, the decrease in speed of the running wheel 4, owing to the engagement of the gear wheel 29 with the gear wheel 28, will be equal to the decrease in speed owing to the turn about the axis 31, whereas the increase in speed of the running wheel 6 owing to a turn about the vertical axis 40 will be equal to the increase in speed owing to the engagement of the gear wheel 38 with the gear wheel 37.

With the arrangement of the wheels 4, 5 and 6, of which one wheel of the first two wheels 4 and 5 is steerable and the other is only capable of rotating about its own axis of rotation, these wheels being spaced apart from one another viewed in the direction of the longitudinal axis, an oblique end 50 is formed at the tractor, where implements can be advantageously coupled. Since the running wheel 6 is located on the side of the horizontal axis of rotation 46 away from the running wheel 4 and also at a distance from the running wheel 5, viewed in the direction of length of the tractor, an oblique side is also formed at the end 51 of the tractor, which is substantially parallel to the line connecting the outermost running wheel 4 or 6 to the running wheel 5, so that agricultural implements or other machines can be coupled with ease thereto. In order to couple implements at the ends 50 and 51 of the tractor, the end 50 is provided with two fastening plates 52 and 53 provided with holes 54 and 55, respectively, whereas the end 51 is provided with two plates 56 and 57, having holes 58 and 58, respectively.

Owing to the position of the motor 7 on one side of the axis of rotation 46, a space is left between the wheel 5 and the wheel 6; this space may also be used to connect implements; to this end the frame beam 1 is provided with tags 60 to 63. If the plates 56 and 57 or the plates 52 and 53 are not directly suitable for connecting implements a strip 64 provided with holes 65 may be secured to the plates, as is shown for the plates 56 and 57. This strip 64 is connected with the plates 56 and 57 by means of stay rods 66 and 67 and bolts 68 and 69; as is evident from FIG. 2, the strip 64 has a lower position than the plates 56 and 57. The strip 64 may, as an alternative, be at level with the plates 56 and 57, or it may have a higher position than these plates.

The arrangement of the running wheels 4, 5 and 6 in a triangle, two corners formed by the running wheels 4 and 6 being located on one side of the tractor and the third corner formed by the running wheel 5 being located on the other side of the tractor, the motor 7 and the seats 8 and 9 being arranged each on one side of the longitudinal axis 44, the seats 8 and 9 being arranged on the same side of the tractor as the running wheel 5, provides the advantage that a satisfactory supervision from the seat of the implement at the end 50 or the end 51 is insured. This is also due to the fact that the ends 50 and 51 have only one running wheel, so that the supervision of the coupled implements is not hindered by a running wheel. The arrangement of the seat on the side of the wheel 5 has the additional advantage that, when travelling along roads with the wheel 5 following the edge thereof, it is easy to prevent the wheel 5 from deviating from this track. If the driving of the wheels of the tractor is such that the speed of travel in one direction can exceed that in the other direction, when travelling along roads, the position of the seat may be adapted to the customs or the traffic of the country where the tractor is used, i.e. to left-hand or right-hand traffic. Also if an implement is arranged between the running wheels 5 and 6, the supervision of this implement is insured.

If a tractor of the aforesaid kind is used in connection with plants growing in rows, it will be advantageous to provide the possibility of varying the lateral gauge of the tractor. To this end, the running wheel 5 is arranged so that it is displaceable with respect to the tractor in a direction parallel to its axis of rotation. Since the running wheel 5 is the sole running wheel on its side of the longitudinal axis 44, only one running wheel need be adjusted to vary the gauge. Since the running wheels 4 and 6, which are arranged at the ends 50 and 51 respectively of the tractor, are both steerable wheels, the advantage is obtained that irrespective of the end to which an implement is coupled, at least one steerable wheel exerts a sufficient pressure on the ground to render the tractor satisfactorily controllable even when used in less favourable conditions such as, for example, when travelling over wet ground. Even if the end 50 has an implement which slightly lifts the end 51 from the ground, the running wheel 4 will insure the controllability of the tractor.

A further advantage of the controllability of the wheels 4 and 6, located each on one side of the axis of rotation 46, is that the tractor is capable of travelling through very sharp turns, so that it is easier to maneuvre coupled implements. When heavier implements, which can be lifted by hand only with difficulty, are attached, this possibility of making sharp turns has the further advantage that the tractor can be readily arranged straight before the implement.

The tractor is provided with two seats 8 and 9 and the wheels 4, 5 and 6 are driven in a manner such that the tractor can travel both in one and in the other direction. Since two seats are provided, the driver can always sit down facing the direction of travel. In order to insure the actuation of the steering wheels and the control of the motor in a simple manner, irrespective of the choice of the seat, two steering wheels 10 and 11 and a double set of control-pedals 70 and 71 are provided.

As shown in FIGS. 7 and 8, which show a different method of fastening the wheel 5 to the frame, the wheel 5 is provided with a horizontal axle 72, journalled in a sleeve 73, connected with the frame. The shaft 72 is provided with a gear wheel 74, which is capable of sliding along this shaft by means of a key on the shaft 72, the driving of this shaft by the gear wheel 74 being thus maintained. The shaft 72 extends beyond the shaft 18, so that the shaft 18 and the shaft 72 cross each other. The gear wheels 74 and 75, the latter driving the gear wheel 74, have a tooth shape suitable for this purpose. Since the shaft 72 is housed in the sleeve 73, the wheel 5 is adapted to be displaced in a direction coinciding with the shaft 72. The shaft 72 can be locked against displacement by known locking devices (not shown). The displacement of the shaft 72 in the sleeve 73 may be obtained by turning the tractor thereby to reduce the gauge of the tractor or to increase the gauge. The displacement of the shaft 72 in the sleeve 73 may, as an alternative, be brought about by means of a hydraulic or other type of mechanism.

As shown in FIG. 9, a tractor according to the invention can be provided at both ends with a raking device. At the end 50 a raking device 80 is connected to the tractor by means of rods 81, whereas at the end 51 a raking device 82 is attached to the tractor by means of rods 83; these raking devices are of the same structure. These raking devices, which displace crop to the side are provided with rake wheels 84 and 85, respectively. When the device travels in the direction 86, the rake wheels 84 of the raking device 80 touch the ground and displace the crop to the right-hand side. With this direction of travel, the rake wheels 85 of the raking device 82 are lifted from the ground by means of a lifting device 87, provided on the raking device 82. When the raking device 80 has worked a strip of ground and the tractor has arrived at one end of the field, the tractor need not be turned, since the raking device 82 may be used to work a second strip of ground at the side of the former. When travelling in the direction 88, the raking device 82 will displace the crop to the left-hand side, so that the crop of the first and the second strip may be readily joined in one swath. When travelling in the direction 88, the rake wheels 84 of the raking device 80 is lifted from the ground by means of the lifting device 89 provided on the raking device 80. By providing a raking device at each end of the tractor, the possibility is provided of working succession a strip of ground where the crop is displaced to the right and a strip where the crop is delivered to the left, so that there is no need for turning at the ends of the strips.

Although the two raking devices, working a strip of ground of which the width is at least as large as the width of the tractor, are pushed implements, they can be supported completely by the tractor owing to the oblique ends of the latter, and in spite of their great lengths these raking devices need not be provided with separate running wheels, which would be the case if such devices were attached in front of the known tractors.

FIG. 10 shows a tractor according to the invention, which is provided at the end 51 with a lifting device 90, comprising three arms 91, 92 and 93, to which a loading shovel 94 is connected. When using a lifting device such as 90, it will be usually desired to arrange the tractor and the motor and the lifting device on different sides of the axis of rotation 46 of the wheel 5. By arranging the motor and the lifting device on different sides of the axis of rotation 46, the center of gravity is displaced to a point nearer the running wheel 4, so that the possibility of tilting the tractor is reduced.

With tractors supported by three wheels, as shown in FIGS. 1 to 10, wherein two wheels are located on one side and only one wheel on the other side, it is advantageous to provide a larger size for the wheel providing the sole support on one side than for the running wheels on the other side of the tractor. By providing a larger size for the wheel which is the sole support, the tractive force exerted on the ground by the wheels to move the tractor will be more uniform on both sides, since a large wheel is capable of exerting a larger tractive force than a small wheel.

If the tractor is to propel a device located at the side of the tractor, it may be advantageous to provide on one side of the tractor more driven wheels than on the other side. By attaching the implement to be moved to that side of the tractor where the larger number of driven running wheels are provided, the tractor will be prevented from running out of line, since the side with the larger number of driven wheels, where the implement to be moved is attached, is capable of exerting a higher tractive force than the wheels on the other side of the tractor. In certain cases it may even be advantageous to provide a plurality of driven wheels only on one side of the tractor or only one driven wheel. If the tractor is to move heavy implements, it may be desirable, however, to provide only driven wheels, as is shown for the tractor of FIGS. 1 to 10.

Figure 11:
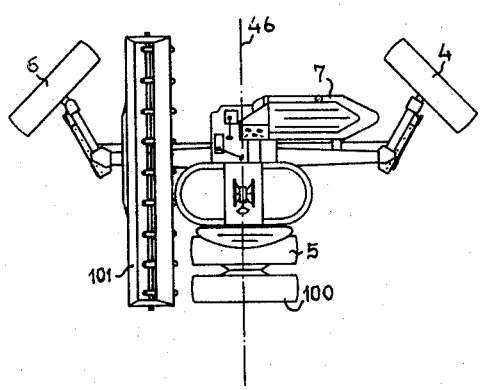
FIG. 11 shows, on a smaller scale, a variant of the tractor shown in FIG. 1, to which a sowing machine is attached.

In FIG. 11, the tractor is provided with a fourth wheel 100; corresponding parts are designated by the same reference numerals as those of FIGS. 1 to 10. By providing a fourth wheel, two wheels being located on each side of the tractor, the four wheels being driven wheels, all wheels may have the same diameter, so that the tractive force on one side does not exceed that on the other side.

By using smaller wheels, the space between the wheels, viewed in the direction of length, may be larger, so that implements can be more readily attached to the tractor between the wheels. FIG. 11 shows that a sowing machine 101 is arranged between the wheels 5 and 100 and the wheel 6. This figure shows the wheels 4 and 6 in a position which they may occupy, when the tractor travels through a curve; the tractor will then make a turn of which the center is located on the axis of rotation 46, since the wheels 4 and 6 are equidistant to the axis of rotation 46 of the wheels 5 and 100.

Figure 12:
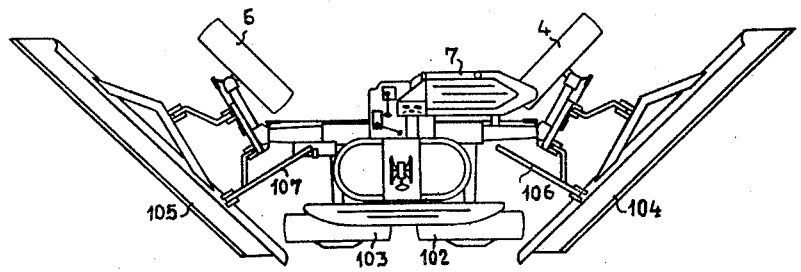
FIG. 12 shows, on a smaller scale, a variant of the tractor shown in FIG. 1, provided at both ends with a routing plane.

FIG. 12 shows a second variant of the tractor shown in the first figures, this tractor also having four wheels, two of which are located on each side of the tractor. Corresponding parts of the tractor of this figure are designated also by the same reference numerals as in FIGS. 1 to 10. In contradistinction to the tractor shown in FIG. 11, where two wheels are located side by side on one side of the tractor, the wheels on one side and the wheels on the other side of the tractor shown in FIG. 12 are arranged one behind the other. The tractor shown in FIG. 12 is provided on one side with the wheels 4 and 6 and on the other side with two wheels 102 and 103, which are located one behind the other and of which the diameters are equal to those of the wheels 4 and 6. The arrangement of the wheels one behind the other increases the stability of the tractor. At the ends 50 and 51 of this tractor is attached a land leveler 104 and 105 respectively. Since a land leveler is provided at each end of the tractor, there is no need for the tractor to be turned at the ends of the strips of ground to be worked. The land levelers 104 and 105 are provided with lifting devices 106 and 107 respectively, by which they can be lifted from the ground so that, if only one land leveler is operative, the other land leveler can be put out of operation.

What I claim is:

1. An agricultural tractor comprising an elongated frame beam defining a longitudinal axis, normally coplanar wheels on said frame beam to one side of said axis, a further wheel on said frame beam on the other side of said axis, a motor on said frame beam, means connecting at least one of the wheels to said motor for driving the tractor selectively in opposite directions, an operator's platform on said frame beam for supporting an operator in at least two different positions and fastening plates on said frame beam adapted for supporting earth working implements, said fastening plates respectively extending on said one side of said axis at an acute angle with respect to said axis and adjacent lines joining the centers of the wheels located to said one side of said axis and the center of the further wheel on the other side of said axis.

2. An agricultural tractor as claimed in claim 1, wherein said motor is located to said one side of said axis, and the operator's platform is mounted on the other side of said axis between said axis and said further wheel, whereby the operator has an unimpeded view of the ground traversed.

3. A tractor as claimed in claim 1, wherein said further wheel has a larger diameter than the other wheels whereby to equalize traction.

4. A tractor as claimed in claim 1, wherein the first said wheels are steerable wheels, comprising means supporting the first said wheels spaced from and rotatable about respective vertical axes, and driving and driven gears connected in series between said motor and each of the first said wheels, said gears having a gear ratio equal to the ratio of the diameter of the associated wheel and twice the distance of the associated wheel from the vertical axis associated therewith.

5. A tractor as claimed in claim 1, wherein said further wheel is adjustable between at least two operative positions at different lateral distances from said frame whereby to adjust the wheel base of said device.

6. A tractor as claimed in claim 1, comprising an additional wheel concentric with said further wheel and connected thereto, all of said wheels being of substantially the same diameter.

7. A tractor as claimed in claim 1, comprising an additional wheel coplanar with said further wheel and connected to said frame beam.

8. A tractor as claimed in claim 1, comprising elements defining angles of less than ninety degrees between the latter elements and said longitudinal axis coupling the first said wheels to said frame beam.

9. A tractor as claimed in claim 1, comprising raking wheels coupled to opposite extremities of said frame beam and arranged in echelon at said extremities to define with said frame beam an isosceles triangle.

10. An agricultural tractor with a frame, said frame comprising an elongated frame beam defining a longitudinal axis, elements defining angles of less than ninety degrees with said longitudinal axis of said frame beam and connected to the ends of said frame beam and extending to one side of said frame beam, a further element defining an angle of ninety degrees with said frame beam and connected to said frame beam substantially at the center thereof, said further element extending from said frame beam in a direction opposite to said first elements, wheels coupled to said elements, a motor on said frame for driving the tractor selectively in opposite directions, an operator's platform on said frame for supporting an operator in at least two different positions and means on the first mentioned elements for coupling implements to the tractor.

References Cited in the file of this patent

UNITED STATES PATENTS

| | | |
|---|---|---|
| 1,325,277 | Damaizin | Dec. 16, 1919 |
| 1,347,526 | Stark | July 27, 1920 |
| 1,412,419 | Pelling | Apr. 11, 1922 |
| 2,081,083 | Beebe | May 18, 1937 |
| 2,524,083 | Ronning | Oct. 3, 1950 |

FOREIGN PATENTS

| | | |
|---|---|---|
| 482,703 | France | Jan. 23, 1917 |
| 117,702 | Switzerland | Nov. 16, 1926 |

OTHER REFERENCES

German application K14122, printed Dec. 13, 1956—K1 45a22.